United States Patent [19]
Silverbrook et al.

[11] Patent Number: 5,900,862
[45] Date of Patent: May 4, 1999

[54] COLOR GENERATION AND MIXING DEVICE

[75] Inventors: Kia Silverbrook, Woollahra; Simon Robert Walmsley, Epping, both of Australia

[73] Assignees: Canon Kabushiki Kaisha, Tokyo, Japan; Canon Information Systems Research Australia Pty Limited, New South Wales, Australia

[21] Appl. No.: 08/396,907

[22] Filed: Mar. 1, 1995

Related U.S. Application Data

[63] Continuation of application No. 08/053,231, Apr. 28, 1993, abandoned.

[30] Foreign Application Priority Data

Apr. 29, 1992 [AU] Australia .................................. PL2152

[51] Int. Cl.$^6$ ........................................................ G09G 5/04
[52] U.S. Cl. ........................................... 345/154; 345/199
[58] Field of Search ..................................... 395/131, 132; 348/71, 598, 599, 582; 345/115, 116, 153, 150, 186, 199, 431, 507, 508; 358/520, 521, 518, 523

[56] References Cited

U.S. PATENT DOCUMENTS

| | | | |
|---|---|---|---|
| 4,524,421 | 6/1985 | Searby et al. ............................ | 364/521 |
| 4,858,011 | 8/1989 | Jackson et al. ......................... | 348/705 |
| 4,930,010 | 5/1990 | MacDonald ............................. | 345/150 |
| 4,958,272 | 9/1990 | Wake ....................................... | 364/518 |
| 4,963,977 | 10/1990 | Jackson et al. .......................... | 358/22 |
| 5,021,876 | 6/1991 | Kurita et al. ............................ | 358/450 |
| 5,025,400 | 6/1991 | Cook et al. .............................. | 345/122 |
| 5,119,176 | 6/1992 | Stec et al. ................................ | 358/30 |
| 5,170,152 | 12/1992 | Taylor ..................................... | 345/153 |
| 5,187,593 | 2/1993 | Kurita et al. ............................ | 358/434 |
| 5,254,978 | 10/1993 | Beretta .................................... | 345/150 |
| 5,272,468 | 12/1993 | Read ....................................... | 345/153 |
| 5,424,754 | 6/1995 | Bar et al. ................................. | 345/150 |

FOREIGN PATENT DOCUMENTS

| | | | |
|---|---|---|---|
| 0121311 | 10/1984 | European Pat. Off. ............... | 345/153 |
| 2243515 | 10/1991 | European Pat. Off. . | |
| 9108638 | 6/1991 | WIPO . | |

OTHER PUBLICATIONS

"Lighting Controls For Synthetic Images", Computer Graphics, vol. 17, No. 3, Jul. 1983, pp. 13–21.

"Principles of Video Processing" by W.T. Underhill. pp. 12–16. 1970. The New Mark VIII. Automatic Colour Camera.

*Primary Examiner*—Lun-Yi Lao
*Attorney, Agent, or Firm*—Fitzpatrick, Cella, Harper & Scinto

[57] ABSTRACT

A color generation and mixing system includes a color priority level input, an effects input, an incoming color input, and a mix level input. From the level input, a base color is determined which is interpolated with the effects input, resulting in a generated color. The generated color is output and mixed with the mixing color in an interpolator under control of the mixing levels.

19 Claims, 10 Drawing Sheets

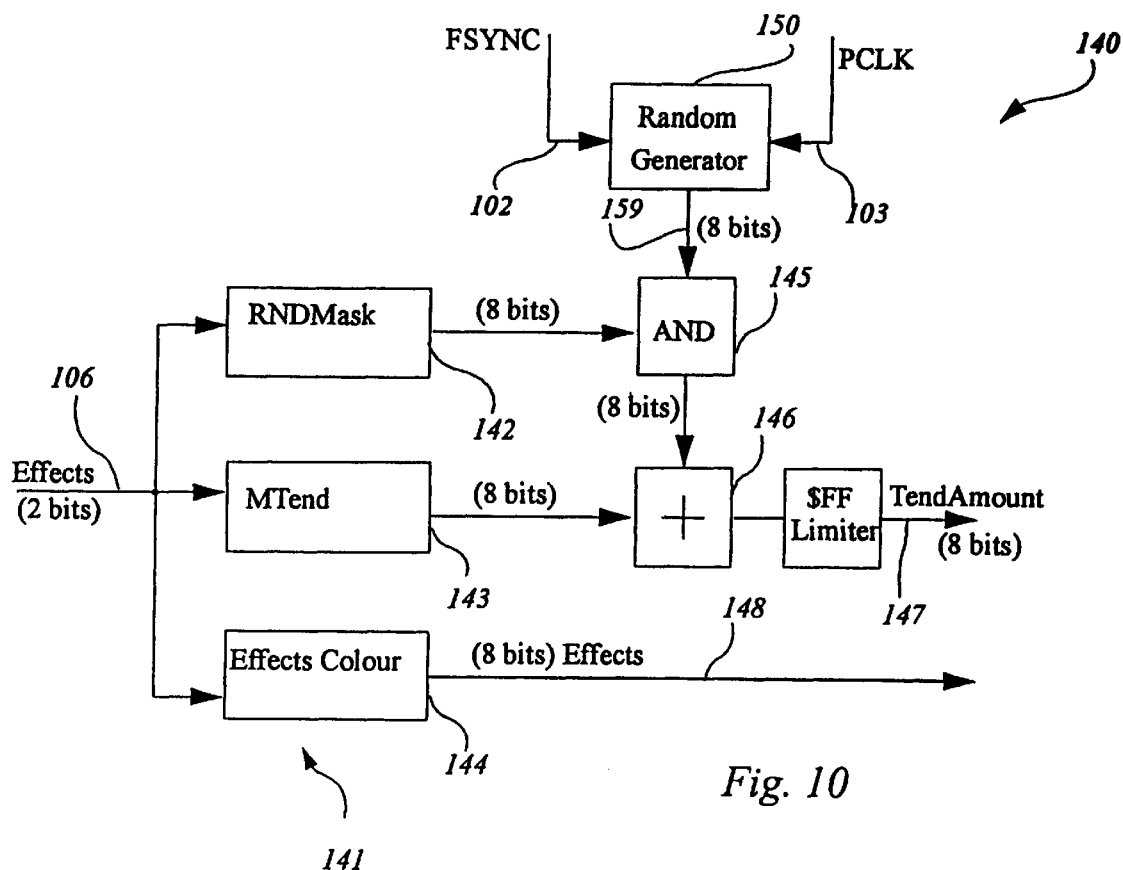
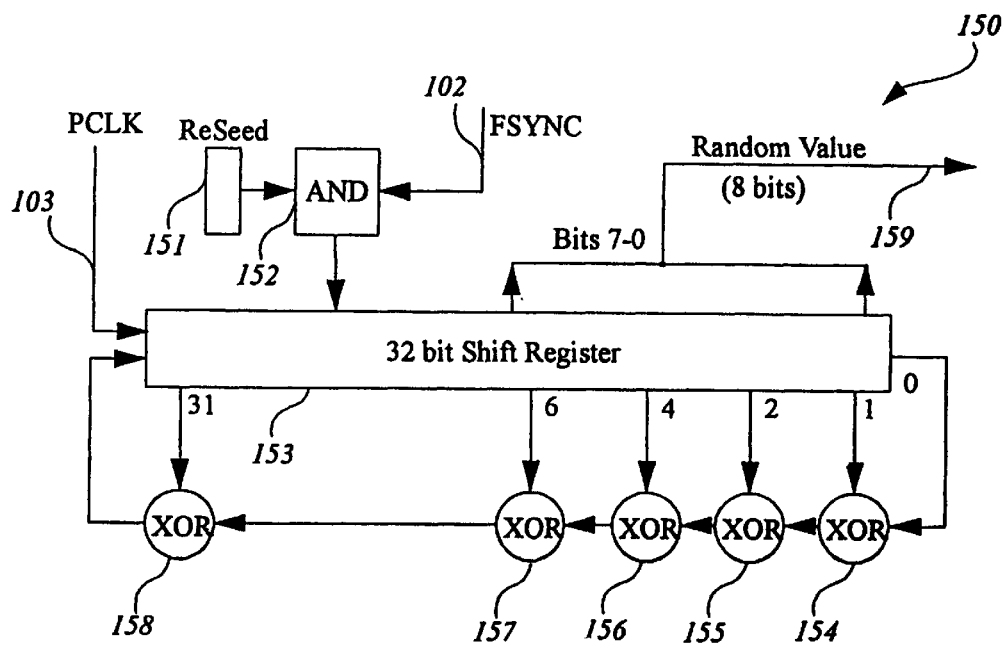
Fig. 10
Fig. 11

COLOR GENERATION AND MIXING DEVICE

This application is a continuation of application Ser. No. 08/053,231 filed Apr. 28, 1993, now abandoned.

BACKGROUND

1. Field of the Invention

The present invention relates to computer-based graphics systems and, in particular, discloses a colour generation and mixing system capable of operation at video data rates at real-time.

2. Description of the Related Art

U.S. patent Ser. No. 08/053,373, filed Apr. 28, 1993 entitled "A Real-Time Object Based Graphics System", claiming priority from Australian Patent Application No. PL 2147, filed Apr. 29, 1992. Lodged concurrently herewith and the disclosure of which is hereby incorporated by reference, discloses a system which provides for the rendering of object-based graphic images in real-time at video data rates.

An example of part of such a system is shown in FIG. 1 where part of a real-time object (RTO) based graphics systems 1 is shown which includes an RTO processor 2 and a colour look-up table (CLUT) 3. The RTO processor 2 and the CLUT 3 connect to various other components (not illustrated) of the system 1 which are seen in the above crossreferenced patent application. The RTO processor 2 is configured to be input with data describing object outlines, and is able to process the outlines of multiple objects for rendering in scan line and pixel dimensions. However, the RTO processor 2 does not attempt to generate colours, which are predefined by the object outlines. In this manner, the RTO processor 2 outputs colour levels of objects, which are synchronised with line and pixel dimensions, that can be externally mapped to any desired colour using the CLUT 3. As seen in FIG. 1, the RTO processor 2 outputs 8 bits of level and effects data which can be termed as level output data 4.

The 8-bit output 4 from the RTO processor 2 comprises 6 bits of LEVEL data and 2 bits of EFFECTS data and can be used to determine the colour at a current position provided by line and pixel dimensions which are synchronised with a display (not illustrated) such as a VDU or a printer. The output data 4 is input to the CLUT 3 wherein the level output data 4 acts as an address for the CLUT 3 which outputs 24-bit RGB data 5 to the display. It will be apparent to those skilled in the art that the CLUT 3 need not contain additive RGB data which is generally used in video devices but can store CMYK (cyan, magenta, yellow and black) data which is a subtractive colour space used in printers such as the CANON CLC 500 Colour Laser Copier. Alternatively, composite video comprising luminance (Y) and chrominance values (Cr and Cb) can also be used.

In the configuration of FIG. 1, the CLUT 3 is arranged to have four sets of 64 entries in which the two effects bits select the appropriate set, and the level bits select the appropriate entry in each set. For example, the first set of 64 entries can be standard colours and the remaining sets can be variations of these colours that can be used to illustrate shadow layers, or other visual effects.

FIGS. 2, 3 and 4 show three examples of an image output that can be created using the RTC system 1. The level data output 4 from the RTO processor 2 follows a simple rule in which:

EFFECTS equals the highest active priority level's effects bits (zero if no levels are active); and LEVEL equals the highest opaque active priority level (zero if no opaque levels are active).

Thus, the priority level determines what will be shown for any given position. When a number of objects are all active at the same pixel location, the highest priority opaque object is displayed using the effects mode of the highest active priority, whether it is opaque or not.

Firstly, in considering the example of FIG. 2, rectangle A has a LEVEL of 10 and an EFFECTS of 0. Rectangle B has LEVEL 20 and EFFECTS 2. When the RTO processor 2 processes the object data to render the rectangles A and B, it implements an odd/even fill rule to fill the objects. That is, when it encounters an object edge at LEVEL N, the RTO processor 2 activates the fill for that level, and when it encounters the next edge, it deactivates the fill for that level. The output from the RTO processor 2 therefore depends on the highest active level's effects bits, and the highest active opaque level's level.

The RTO processor 2 is configured to implement transparency and when transparency is disabled, the effects modes 0, 1, 2 and 3 are all opaque. Accordingly, the highest active priority level will always be the highest active opaque level as all effects are opaque.

FIG. 3 illustrates the displayed image when transparency is disabled using inputs identical to those of FIG. 2. The net effect is that the objects drawn at higher levels (e.g. rectangle B) completely obscure objects drawn at lower levels (e.g. rectangle A).

When transparency is enabled in the RTTO processor 2, effects modes 0 and 1 are opaque, and effects modes 2 and 3 are fall-through. The output from the RTO processor 2 can then be seen in FIG. 4 and explained as follows:

where no LEVELS are active, the output is LEVEL 0, EFFECTS 0;

within the part of rectangle A that does not intersect with rectangle B, the highest active LEVEL is 10. The effects for LEVEL 10 is 0. The highest active opaque is also LEVEL 10 (as EFFECTS 0 is opaque). Therefore, the output for this section is LEVEL 10, EFFECTS 0;

within the part of the rectangle B that does not intersect with rectangle A, the highest active LEVEL is 20. The effects for LEVEL 20 is 2. There are no active opaque LEVELS (as level 20 has EFFECTS 2 which is fall-through), so the output for this section if LEVEL 0, EFFECTS 2;

Within the intersection of rectangles A and B, the highest active LEVEL is 20.

The EFFECTS for level 20 is 2. The highest active opaque LEVEL is 10 (as LEVEL 20's EFFECTS 2 is fall-through, but LEVEL 10's EFFECTS 0 is opaque).

Therefore the output for this section is LEVEL 10, EFFECTS 2.

The net effect of the above, is that the objects drawn in fall-through effects modes cause a fall-through to the first opaque level below them. The output retains the effects mode of the fall-through level. Rectangle B is effectively a transparent rectangle, and the effects bits for it will be active, while it is the highest active level. At the intersection point, instead a level 10 effects 0, the effect is level 10 effects 2, which causes a look-up to a different colour, for example a darker version of level 10 effects 0, which would give a shadow effect.

The RTO system 1, FIG. 1, requires that the CLUT 3 is updated regularly so that the correct colour is stored in each entry. This is performed by connecting the CLUT 3 to a host processor which can alter the contents of the CLUT 3, for example on an image basis allowing any 256 colours in the palette of the CLUT 3.

By altering the contents of the CLUT 3 unlimited complexity for colour and effects can be provided merely by updating each entry using software. However, limits of update and calculation time in a real-time environment limit the visual effects that the system 1 is capable of producing.

Accordingly, it is an object of the present invention to substantially overcome, or ameliorate, the problems of updating the colour entries in the CLUT 3.

SUMMARY OF THE INVENTION

In accordance with one aspect of the present invention, there is provided a colour mixing and generation system comprising a first input connected to a first colour determination means for determining a base colour, a second input connected to a second colour determination means for determining an effects colour and a first interpolator means for determining a generated colour, from said base colour and said effects colour;

Preferably, said colour mixing and generation system further comprises a second interpolator means for mixing said generated colour with a mixing input colour signal to thereby provide an output signal of said system.

Preferably, a mixing signal can also be input to the second interpolator means to permit variations in the mixing of the generated colour and the input colour signal.

BRIEF DESCRIPTION OF THE DRAWINGS

A number of embodiments of the present invention will now be described with reference to the drawings in which:

FIG. 10 is a schematic block diagram representation of the calculate effects unit of FIG. 7;

FIG. 11 is a schematic block diagram representation of the random generator of FIG. 10;

DETAILED DESCRIPTION OF THE PREFERRED EMBODIMENT

Figure 1:
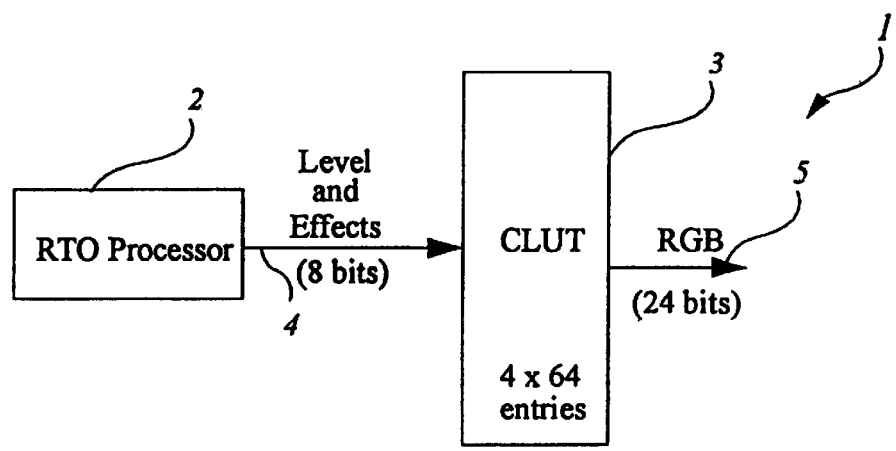
FIG. 1 shows a schematic block diagram representation of part of an RTO graphics system.
Figure 2:
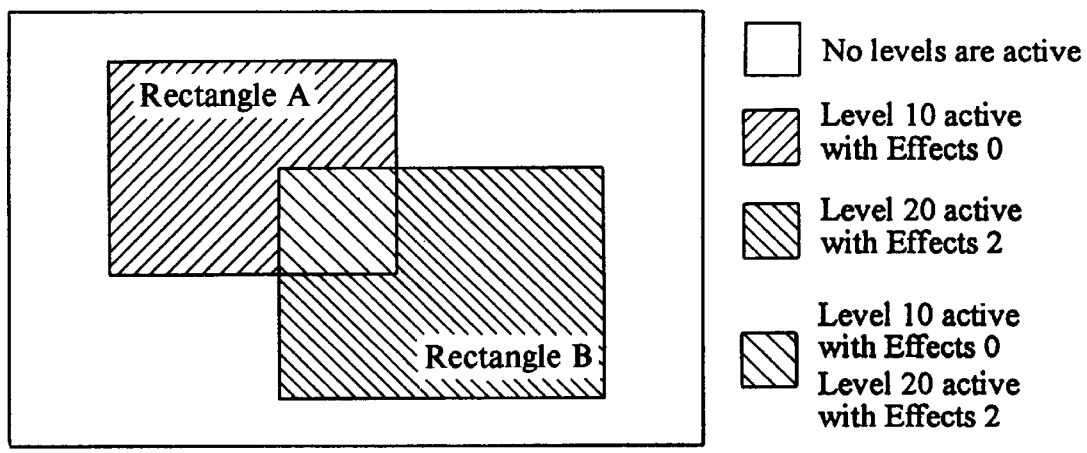
FIGS. 2, 3 and 4 show various fill and effects outputs for the system of FIG. 1.
Figure 3:
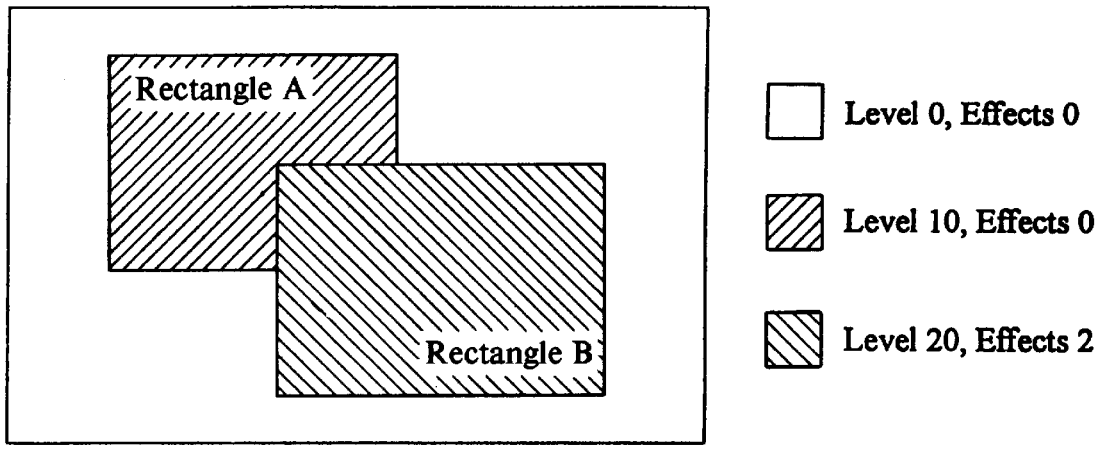
Figure 4:
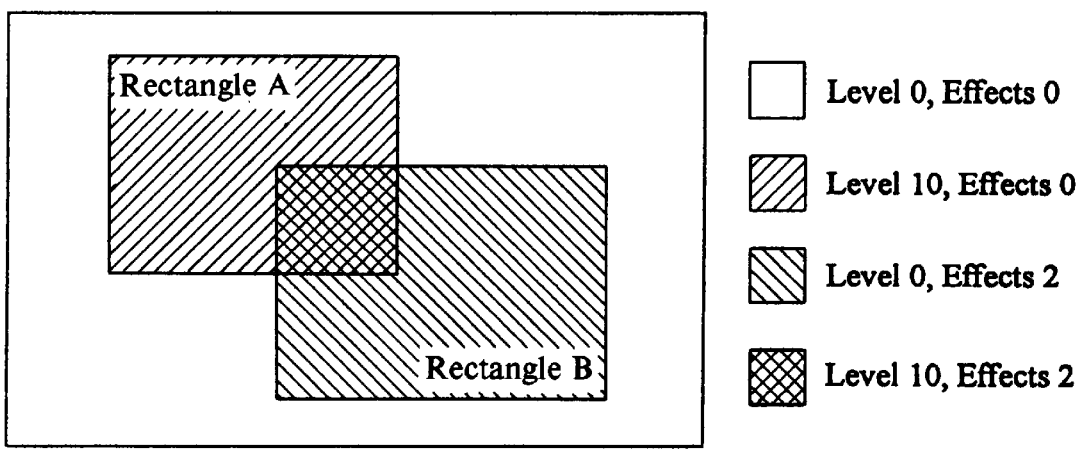
Figure 5:
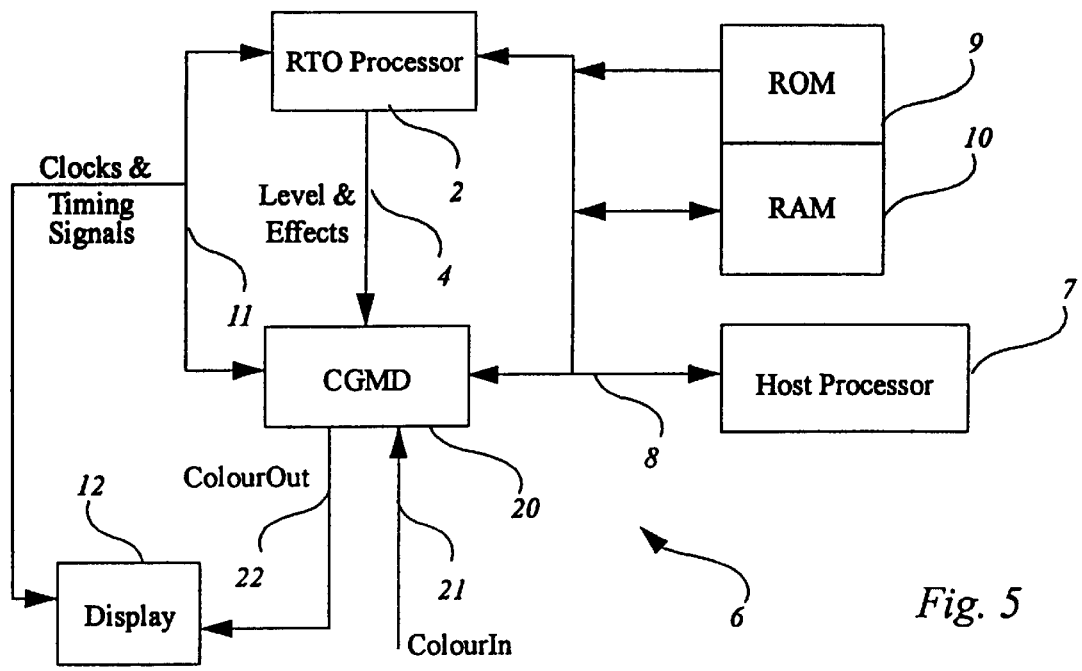
FIG. 5 is a schematic block diagram representation of an RTO graphics system incorporating a colour generation and mixing (CGM) device of one embodiment.

Referring firstly to FIG. 5, shown is an RTO graphics system 6 which includes a host processor 7 connected via a system bus 8 to the RTO processor 2, a ROM unit 9 and a RAM unit 10. The bus 8 also connects to a colour generation and mixing (CGM) device 20 which replaces the CLUT 3 seen in the system of FIG. 1. The device 20 can output to a display 12 such as a video display unit or a printer which includes various clocks and timing signals 11 which are input to the RTO processor 2 and the device 20 so as to maintain synchronism for the generation of images. The device 20 further includes a colour input 21 and a colour output 22 which in the preferred embodiment permit the production of various effects such as blends, shadows, colour mixes and random texturing. The device 20 provides the ability to generate colour for RTO images coupled with an ability to mix the generated colour with an incoming colour signal 21, such as video. The device 20 further provides for simple transformations of colours to be performed for different effects modes, and also for independent blending in either the scan line and/or pixel directions.

The general operation of the RTO graphics system 6 involves the host processor 7 writing to the RAM 10 in order to build up object lists for display. The host processor 7 also writes to the device 20 via the bus 8 to supply colour information to an internal colour look-up table complementing the operation of the CLUT 3 of FIG. 1. When the objects lists in the RAM 10 are complete, rendering is commenced by writing the objects lists to the RTO processor 2. The RTO processor 2 proceeds to output 8-bit level and effects information 4 in the manner described above. The level and effects information 4 is supplied to the device 20 where the colour is calculated, and merged with any incoming colour signal 21 to produce an output colour signal 22.

Figure 6:
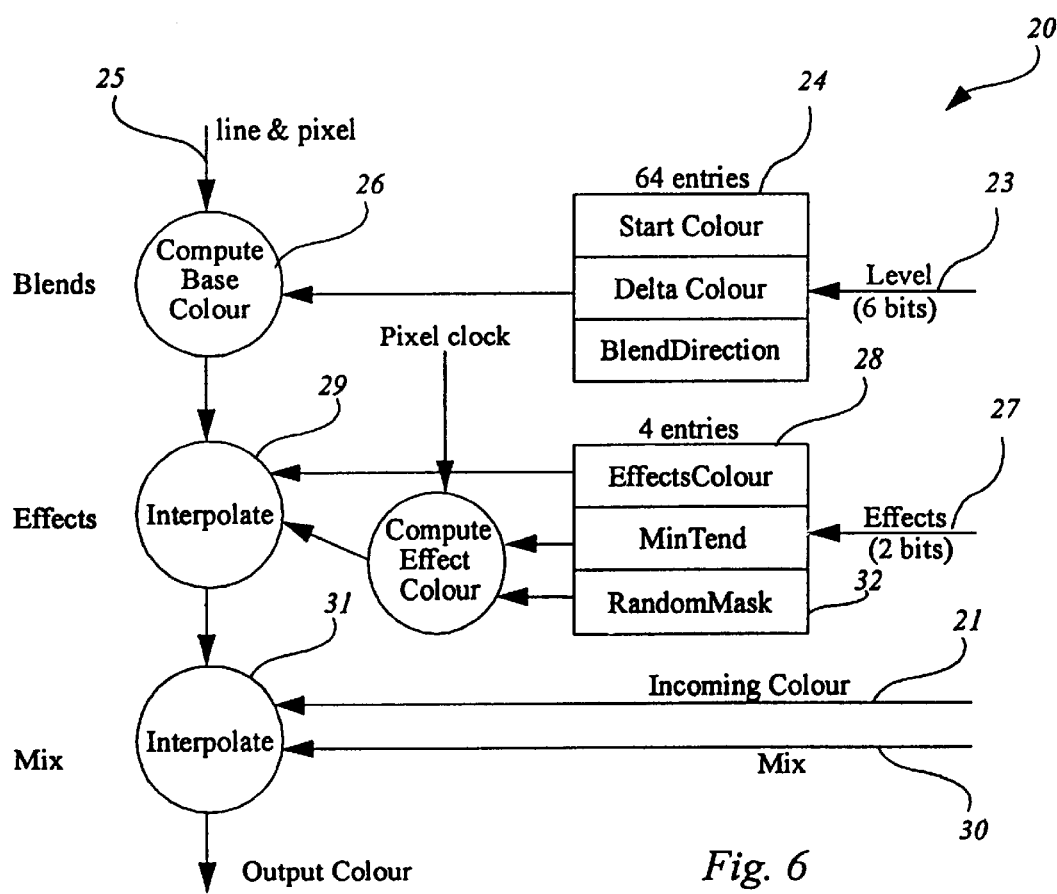
FIG. 6 is a schematic block diagram representation of an embodiment of the CGM device.

Turning now to FIG. 6, it is the role of the CGMD 20 to control the mixing of a calculated colour value (supplied by the RTO processor 2) with an incoming value provided at the input 21. Advantageously, the device 20 is configured as an application specific integrated circuit (ASIC), although discrete construction can be performed, and preferably a single such device is only capable of manipulating a single colour component of a colour space (such as the red component of RGB colour space). Within the device 20, this colour component is merely referred to as "colour". In order to process a full colour space, it is preferable that a number of the devices 20 to be operated in parallel for each incoming colour component. Referring now to FIG. 6, the device 20 generates a colour which is used to mix with the incoming colour 21 and the generated colour is determined by the level input 23 and the effects input 27. The level input 23 selects a base colour from a level table 24 which comprises 64 entries, each having a StartColour, a DeltaColour and a BlendDirection. The selected entry is then synchronised with a line and pixel input 25, corresponding to the timing and clock signals 11 of FIG. 5, so as to compute the base colour 26. The effects input 27 selects entries from an effects table 28 which has four entries, each comprising an EffectsColour, a MinTend and a RandomMask. The selected entry from the table 28 is combined with the base colour 26 in an interpolator 29 to output the generated colour used for mixing. This is input to a further interpolator 31 which is also input with the incoming colour 21 for mixing at an internally defined level, or at an externally defined level using a mixing source 30, to provide an output colour 22. The transformations provided by the effects bits allow for the production of effects such as shadows, fire and water, and can include random components to produce mist, smoke and various textures.

Figure 7:
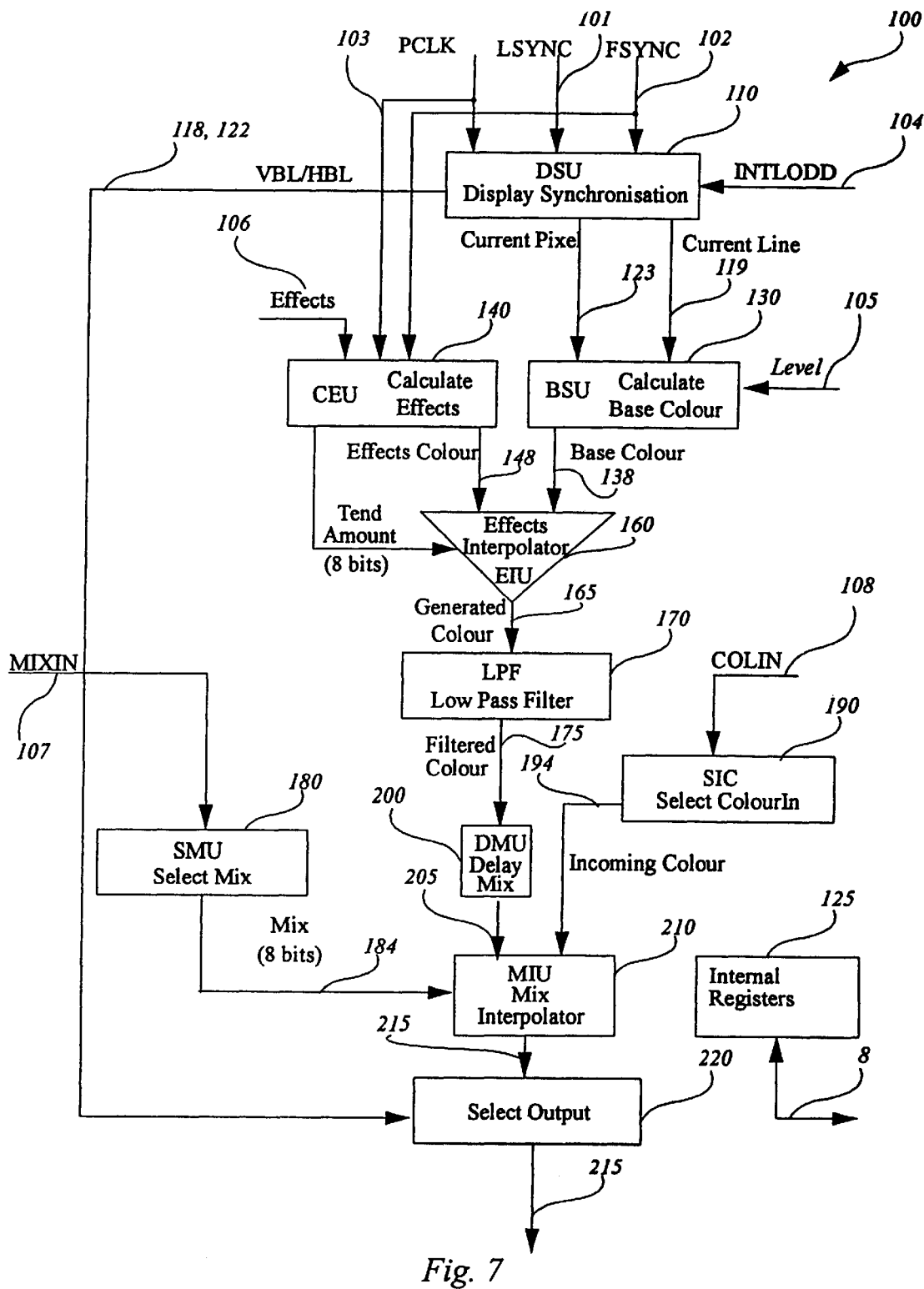
FIG. 7 is a detailed schematic block diagram representation of a preferred embodiment of the CGM device of FIG. 6.

Turning now to FIG. 7, a preferred form of a CGM device 100 is shown arranged in a manner similar to the configuration of the device 20 seen in FIG. 6. The method by which the device 100 calculates the colour output at any time can be summarised as follows:

update the current line and current pixel,
calculate the base colour for the given level at the current line and pixel;
calculate the effects for the given effects mode;
interpolate between the base colour and the effects colours;
apply a low pass filter to the generated colours;
select external or internal mix amounts;
select external or internal colour to mix with;
mix the filtered generated colour with the incoming colour; and
select between the mixed colour and blanking colour for a final colour output.

As seen in FIG. 7, the CGM device 100 interfaces with other devices, such as those of FIG. 5, in various ways. Firstly, CGM device 100 is input with a line synchronisation (LSYNC) signal 101, a frame synchronisation (FSYNC) signal 102, and a pixel clock (PCLK) signal 103. These signals are derived from the display device (e.g. a VDU or printer) driven by the CGM device 100. Also input is an interlaced-odd (INTLOOD) signal 104 which is used to indicate odd frames in interlace displays. The CGM device 100 also includes a level input 105 and an effects input 106, a mixing input (MIXIN) 107, and a colour input (CLRIN) 108. The device 100 outputs an output colour 109.

Also shown in FIG. 7 is a block of internal registers 125 which connect to the system bus 8, for example as seen in FIG. 6. The internal registers 125 provide storage for all colour and effects data as well as other control and status variables which will be described later.

Figure 8:
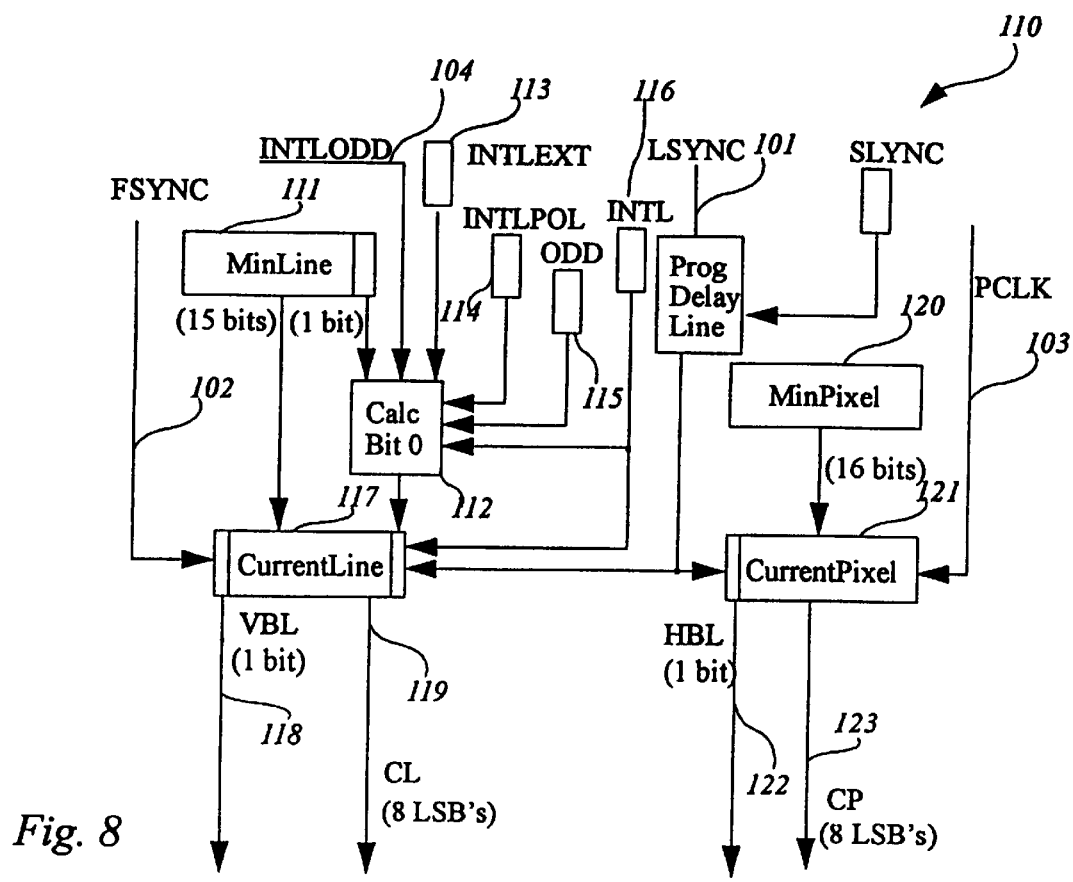
FIG. 8 is a schematic block diagram representation of the display synchronisation unit of FIG. 7.

With reference to FIGS. 7 and 8, a display synchronisation unit 110 is provided which enables the CAM device 100 to synchronise its output with its input device, the RTO processor 2, and the display device. Display synchronisation unit 100 is input with the signals LSYNC 101, FSYNC 102, PCLK 103 and INTLOOD 104. The display synchronisation unit 110 has a number of externally accessible registers. In the preferred embodiment, these correspond to registers of the RTO processor 2 described in the aforementioned U.S. patent application Ser. No. 08/053,373. The first of these registers is a MnLine register 111. This is a read/write register indicating the (negative) value representing the number of lines in the frame blanking period. It is used to initialise a CurrentLine register 117. The MnLine register 111 is preferably 14 bits wide including a single sign bit.

A MinPixel register 120 is also provided which is also 14 bits wide, has read/write access, and indicates the (negative) value representing the number of pixels in the line blanking period. It is used to initialise a CurrentPixel register 121 and includes a signed bit. The CurrentLine register 117 and the CurrentPixel register 121 respectively display the CurrentLine and CurrentPixel being calculated.

An INTL register 116 is provided which is a single bit of a control register of the CGM device 100. The INTL bit enables interlaced rendering, which causes internal line counters of the CGM device 100 to increment by 2 with every line synchronisation signal.

An INTLEXT register 113 is another single bit register of the control register. When interlacing is enabled, the setting of this bit causes the external input pin INTLOOD 104 to be used to determine whether an odd or even frame is being rendered. Otherwise, this is determined from a further control register bit ODD 115. When INTLEXT bit 113 is cleared, the ODD bit 115 is used to distinguish between even and odd frames, and is set or cleared by the host processor 7 before each frame. Setting the ODD register 115 indicates that an odd frame is being rendered.

The last register input of the display synchronisation unit 10 is another single bit register of the control register, INTLPOL 114. This register indicates the polarity of the INTLOOD input 104. If INTLPOL 114 is cleared, a high level on the INTLOOD pin 104 denotes an odd frame. If INTLPOL 114 is set, a high level on INTLOOD 104 represents an even frame.

As seen in FIG. 8, six of the aforementioned input registers supply a CALC BIT 0 block 112 which is used to calculate the lowest bit of the CurrentLine register 117 when it is loaded from the MinLine register 111 upon enabling from a frame sync signal 102. The CALC BIT 0 block 112 allows the low bit of the MinLine register 111 through when display is not interlaced, and forces the bit to be 0 and 1 depending on the oddness of the field if the display is interlaced. The CALC BIT 0 block 112 calculates a logical output as follows:

$$CurrentLine(0)=(!Interlaced\ \&\ MinLine(0)+Interlaced\ \& ((!IntExt\ \&\ Odd)\ +(IntExt\ \&\ ((!IntPol\ \&\ ExtOdd)+ (IntPol\ \&!ExtOdd)))) \qquad (EQ\ 1)$$

When the LSYNC signal 101 occurs, it indicates that the current line has ended and that line blanking is occurring. The value of the Minlixel register 120 is copied into the CurrentPixel register 121, and the CurrentLine register 117 is incremented by 1+INTL (that is, INTL acts as the carry-in to the addition).

When the FSYNC signal 102 occurs, it indicates that the current frame has ended, and that frame blanking is occurring. The value of the MinLine register 111 is copied to the CurrentLine register 117. If the display is not interlaced, bit 0 of the CurrentLine register 117 reflects bit 0 of the MiLine register 111. If the display is interlaced, bit 0 of the CurrentLine register 117 reflects the phase of the field being rendered. It will be 1 for an odd field, and 0 for an even field.

When the pixel clock 103 signal occurs, the current pixel value in the register 121 is incremented by 1.

As seen in FIG. 8, the display synchronisation unit 110 has a current line output 119 comprising the 8 least significant bits (LSB's), from the register 117 and a current pixel output 123, comprising the 8 LSJB's, from the current pixel register 121. Also output are single bit outputs VBL 118 and HBL 122. VBL 118 indicates vertical blanking, and HBL 122 indicates horizontal blanking.

Figure 9:
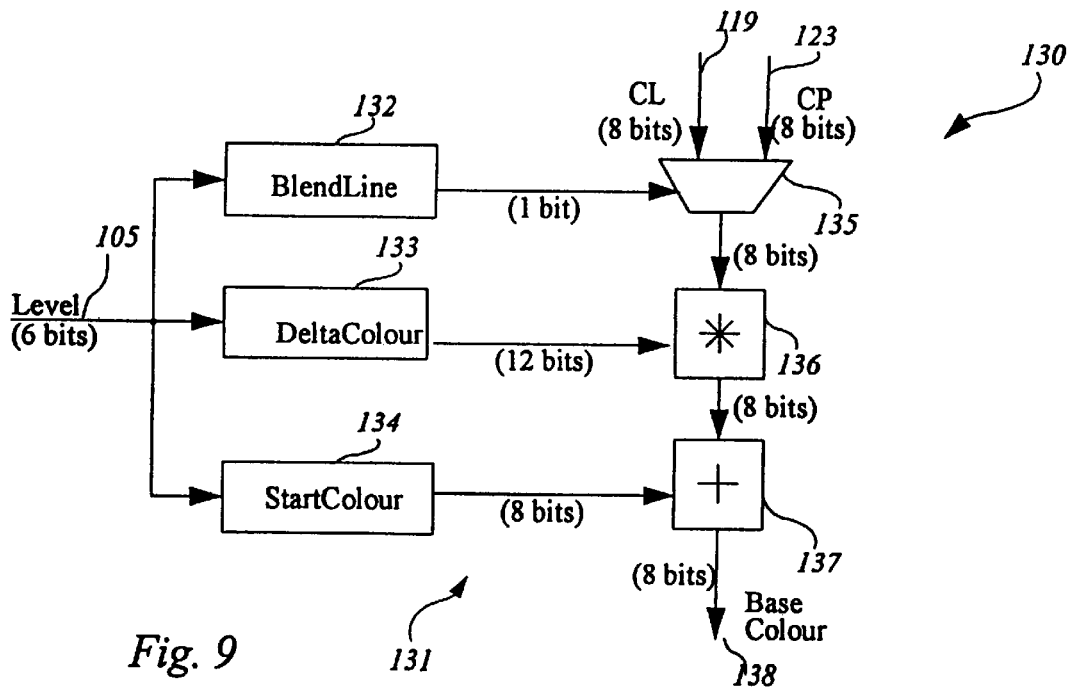
FIG. 9 is a schematic block diagram representation of the calculate base colour unit of FIG. 7.

As seen in FIG. 7, the current pixel output 123 and the current line output 119 are input to the calculate base colour unit 130, which is seen in FIG. 9. Base colour unit 130 is input with 6 bits of level data 105 which act as address determining bits for 64 sets of base colour registers 131, forming part of the internal registers 125, with each comprising a BlendLine register 132, a DeltaColour register 133, and a StartColour register 134. The BlendLine register 132 represents the direction of a colour blend for a given level. It is a single bit register and if set, the blend is in the line direction. If clear, the blend is in the pixel direction. If the value in the DeltaColour register 133 is 0, then there is no effective blend, and so the value of the BlendLine register 132 is irrelevant. The StartColour register 134 represents the colour of the blend at the first line or pixel of the image. This is only the same as the first displayed pixel on the level if the object is drawn at line or pixel 0. If there is no blend on the level, then the value of the StartColour register 134 represents the colour of the level. The DeltaColour register 133 represents the amount by which the colour changes over one line or pixel (depending on the direction of the blend). The register 134 comprises 12 bits which represent a signed fixed point number having a single sign bit, 6 integer bits, and 5 fraction bits. If there is no blend for a particular level, then the value of the DeltaColour register 133 is 0. Each of the registers 131 is a read/write register accessible via the processor bus 8.

The calculate base colour unit as seen in FIG. 9 includes a multiplexer 135 which, under control of the value of the BlendLine register 132, selects either the current line output 119 or the current pixel output 123. The selected output is input to a multiplier 136 which performs a multiplication with the value in the DeltaColour register 133. The multiplier 136, although multiplying an 8-bit value by a 12-bit value, in the preferred embodiment selects only the 8 most significant bits which are output to an adder 137. The value of the StartColour register 134 is also input to the adder 137 which thereby provides a base colour output 138. The base colour for a given level at a particular line or pixel can be determined by the following formula:

$$\text{BaseColour} = \text{StartColour} + \begin{bmatrix} \text{CurrentLine} \\ \text{OR} \\ \text{CurrentPixel} \end{bmatrix} \times \text{Delta Colour} \quad (EQ2)$$

Table 1 shows the effect of the value of the DeltaColour register 133 on the length of the blend over the range of values allocated in the preferred embodiment.

pixel, cannot be guaranteed to be the exact values required. For instance, the base colour may be calculated to be 0xFF, but the desired value is 0x00. On an RGB system, the colour difference is a white line or pixel where a black one is desired. On a YCrCb system, the problems occur around 0x7F and 0x80 since Cr and Cb are signed. It is therefore necessary that the values in the base colour registers 131 be determined for the particular colour system being used so as to ensure that invalid values are not possible. On an RGB system, this could be achieved by limiting colours to 0x01–0xFE.

Furthermore, given an object's starting position (line or pixel), its StartColour, EndColour and the length of blend, then:

$$\text{DeltaColour} = \frac{(\text{EndColour} - \text{StartColour})}{\text{length}} \quad (EQ3)$$

$$\text{StartColour} = \text{StartColour} - (\text{Delta} \times \text{StartPos})$$

Furthermore, it should be noted that these values must be represented in fixed point format, and the fixed point value for DeltaColour should be used to determine the StartColour for the device 100.

Referring now to FIGS. 7 and 10, the effects input 106 supplies the calculate effects unit 140 and provides addresses for four sets of effects registers 141, with each set comprising a RandomMask register 142, a MinTend register 143 and an EffectsColour register 144. The effects mode gives the CAM device 100 the ability to change the base colour 138 by tending it towards an effects colour defined by the register 144 by a fixed or random ranged amount. Tending one colour towards another by an amount gives the ability to produce shadows, embossing, rain, mist, water, fire, electric colours and texturing, for example.

The RandomMask register 142 is an 8-bit read/write register and its value is ANDed in an AND gate 145 with a random value 159 output from a random generator 150. The random generator 150 is input with the frame sync signal 102 and the pixel clock signal 103 and is shown in more detail in FIG. 11 (described later). The pixel clock 103 is used to update the random number, once per pixel. The

TABLE 1

Effect of Delta Colour on Length of Blend

| Delta Value (+−) | Steps Before Change | Length of Blend | Comments |
|---|---|---|---|
| 0 | Infinite | | Produces static colour (i.e. no blend) |
| 1/32 | 32 | 8192 | Longest blend possible |
| 2/32 | 16 | 4096 | Useful for blending over a large object |
| 11/32 | 2.9 | 745 | Useful for blending on a screen |
| 17/32 | 1.875 | 482 | Useful for blending on a screen |
| 1 | 1 | 256 | Every colour is represented once in the blend |
| 4 | 1 | 64 | Small blend |
| 32 | 1 | 8 | Very small blend |
| 63 31/32 | 1 | 4 | Shortest blend possible |

Furthermore, it should be noted that the multiplier unit 136 does not implement a full multiply. Only the lower 8 bits of the integer result bits (12-5) are used. The fractional bits (4-0) are discarded. In this manner, the multiplier 136 introduces a rounding error.

Also, the adder 137, having only an 8-bit output requires that the high bit of the result is discarded which indicates that a wrap can occur.

In view of the two points above, these indicate that the blended colours, the first line or pixel, and the last line or MinTend register 143 is another 8-bit read/write register and this represents the minimum amount by which the base colour 138 will tend towards the effects colour 144 output from the unit 140 via an output 148. The effects colour 144 is a further 8-bit read/write register and this represents the colour that the base colour 138 will tend towards.

As seen in FIG. 10, the AND gate 145 supplies an adder 146 also input with the output of the MinTend register 143. The adder 146 is limited to $XFF and this outputs a TendAmount 147.

Turning briefly to FIG. 11, the random generator 150 is shown which is formed about a 32-bit shift register 153 using exclusive of feed-back via 5 XOR gates 154, 155, 156, 157 and 158, connected as illustrated. The lower 8 bits of the shift register 153 are used to determine the random number 159 and this is updated with every pixel clock 103. The shift register 153 is seeded (loaded) when a Reset signal is written to the CGM device 100.

It is also re-seeded with every FSYNC signal 102 whenever a ReSeed bit 151 of the control register is set. The value of the ReSeed register 151 and the FSYNC signal 102 are combined in an AND gate 152 which outputs a seed or shift value to the shift register 153. Note that the shift value f6r the shift register 153 must not be zero because a seed value of zero will cause the register 153 to remain at 0.

Returning to FIG. 10, variations in the choice of values of the MinTend register 143 and of the RandomMask generator 142 can give widely different effects. For example, with RandomMask 142 equalling 0 and MinTend 143 equalling 0, the TendAmount 147 will also be 0. These values would be chosen to ensure that no effect was applied to the base colour 138.

For a RandomMask 142 of 0 and the MinTend not equal to 0, the base colour 138 will tend towards the effects colour 144 by a fixed amount (MinTend). This can be used to produce effects such as shadows, by tending 50 (out of 255) towards black.

With a RandomMask value of between 0 and FF, and a MinTend value of 0, this means that the entire eight random bits from the random generator 150, are passed to the adder 146 (and added to 0). This means that the TendAmount 147 will vary from pixel to pixel between 0 and 255 and can be used to create (random) noise in a colour component.

With the RandomMask 142 having a value between 0 and 1F, and MinTend having a value between 0 and 20, this means that the TendAmount 147 will vary between 0 and 20 and 0 and 3F randomly. This can be extremely useful in producing textured effects, such as randomly choosing shades of green. Mists, ghosts and smoke can utilise this effect when the mix value comes from a randomly effected similar CAM device 100, as will be described later.

To produce a random tend amount 147 in a given range, the RandomMask 142 and MinTend 143 registers need to be set accordingly. For example, to produce numbers in the range 0×30–0×4F, the MinTend value 143 should be set to the minimum value (0×30), and the RandomMask value 142 should be set to that set of bits that will produce the correct range (i.e. 0×1F).

Furthermore, it is noted that setting the RandomMask 142 to 4, will not produce random numbers in the range 0–4. Due to the RandomMask 142 being ANDed with the random number, the only numbers generated will be 0 and 4. Random numbers 1, 2 and 3 will each be reduced to 0. This effect may be desired for example in the production of textures.

The output of the adder 146 is limited to between 0 and FF to allow for saturation of any particular effect. For instance, if it were desired to slowly fade a scene to a particular colour randomly, for effect such as mist becoming thicker and thicker, the MinTend value 143 can be set up to be initially 0, with the RandomMask 142 between 0 and 1F, and the effects colour for the value of "white". As the mist becomes thicker, the TendAmount 147 can be increased slowly from 0 to FF. The random amount between 0 and 1F would always be added to the MinTend value 143, and would be limited to between 0 and FF. This would permit the random amount, output from the AND gate 145 to become less and less meaningful, as the colour becomes more and more white.

Figure 12:
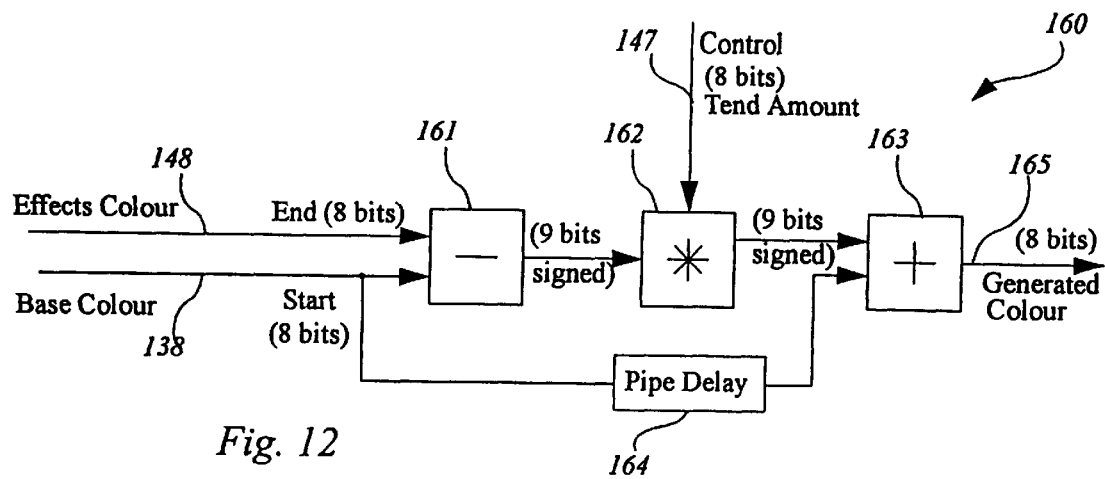
FIG. 12 is a schematic block diagram representation of the effects interpolator unit of FIG. 7.

The calculate effects unit 140 and the calculate base colour unit 130 each output to an effects interpolator 160, seen in FIG. 7 and in detail in FIG. 12. The effects interpolator unit 160 applies the calculated effect to the calculated base colour 138. It tends the base colour 138 towards the effects colour 148 by a control amount set by the TendAmount 147. The higher the level of control, the more of the effects colour 148 comes through. For example if control=0, the output is 0% effects colour and 100% base colour 138;

if control=128, the output is 50% effects colour 148 and 50% base colour 138; and if control=255, the output is 100% effects colour 148, and 0% base colour 138.

The interpolator 160 in this manner interpolates between a start value and an end value using the control value to indicate the proportion of the distance between the start and end values. As seen, the effects colour 148 and the base colour 138 are input to a subtractor 161 which subtracts the former from the latter and has an output connected to a multiplier 162. The multiplier 162 is also input with the TendAmount 147. The base colour 138 is also passed, via a pipe delay 164, compensating for the operations of the subtractor 161 and the multiplier 162 to an adder 163 which is also input with the output of the multiplier 162. The two values are thereby summed to create a generated colour 165. The operation of the interpolator 160 can be summarised as follows:

$$\text{Output} = \frac{(\text{Control} \times \text{End})}{256} + \frac{(255 - \text{Control})\text{Start}}{256} \quad (EQ4)$$

$$\therefore \text{Output} \cong \frac{\text{Control}(\text{End} - \text{Start})}{256} + \text{Start}$$

The multiplier 162 takes 8 bits for each operand, but only outputs the most significant 8 bits, thus implementing a divide by 256.

Figure 13:
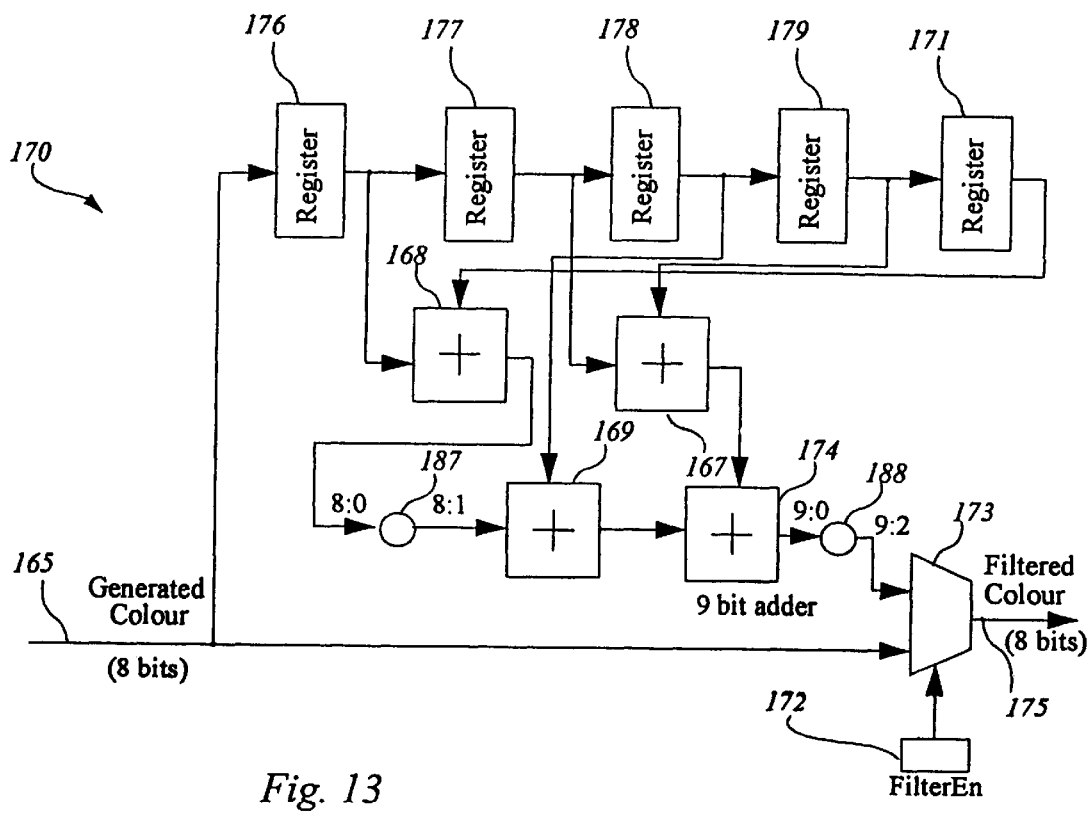
FIG. 13 is a schematic block diagram representation of the low pass filter unit of FIG. 7.

Returning to FIG. 7, the output of the effects interpolator unit 160 is input to a low pass filter 170, shown in FIG. 13. The low pass filter unit 170 is configured to perform a low pass function and the example shown in FIG. 13 provides a means of averaging the generated colour 165 over 5 pixels. This provides a form of anti-aliasing (for combining with the background colour such as video) in the pixel direction only, and reduces large differences between two pixels' chrominance values. Large differences in chrominance between adjacent pixels can seriously impact upon video quality.

The low pass filter is a 5 tap finite impulse response (FIR) filter. The FIR filter is preferred because of the linear characteristic of its phase response, which is important in video applications. The performance of the filter 170 is a trade-off between simplicity of the coefficients in the transfer function and the desired frequency response. The filter 170 has been designed by optimizing the square of the difference between the ideal frequency response and that of the real filter with coefficients that are powers of 2. The equation of the filter is:

$$y_n = \frac{1}{8}(x_{n-1} + 2x_{n-2} + 2x_{n-3} + 2x_{n-4} + x_{n-5}) \quad (EQ\ 5)$$

The filter can be enabled by setting the FilterEn bit 172 of the Control register. In order to guarantee sensible initial setup conditions at each line start, the filter 170 is disabled during the first 6 pixels The low pass filter 170 is implemented by using incoming pixels in a pipeline process to form the above summation. The colours in previous pixels are retained in storage registers 171, 176, 177, 178 and 179, with the above summation being formed from adders 167, 168, 169 and 174 and single shifter 187 and double shifter 188.

The output of the shifter 188 supplies a multiplexer 173, also input with the generated colour 165 and enables via a filter enable bit 172 of the control register. Only the top 8 bits are output as filter output colour 175.

Figure 14:
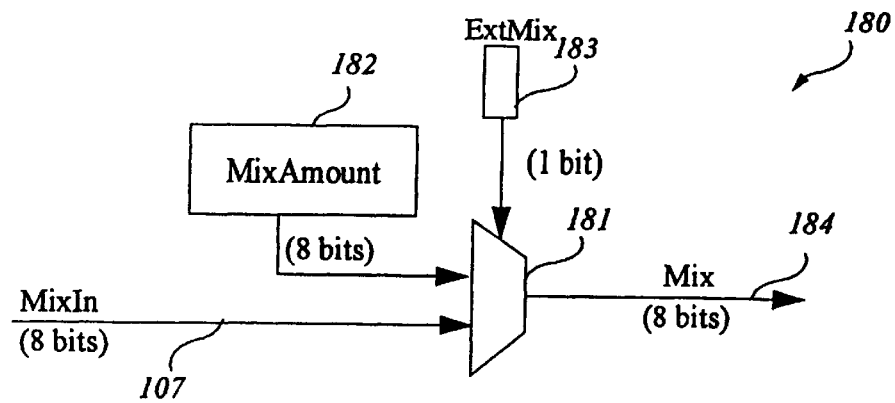
FIG. 14 is a schematic block diagram representation of the select mix unit of FIG. 7.

Returning to FIG. 7, the mixing input MIXIN 107 supplies a select mix unit 180, seen in FIG. 14. Where the CGM device 100 is provided with an incoming colour signal 108, this must be mixed with the filtered colour 175. The amount of mix is determined by an internal value provided by a MixAmount register 182, or via an external signal provided on the MIXIN input 107. A control bit ExtMix 183 in the control register selects which of these two values is used as the mixed value for a mix interpolator 210. As seen in FIG. 14, the MIXIN N input 107 and the mix amount register 182 each supply a multiplexer 181, whose mix output 184 is selected via the ExtMix bit 183.

If the mix value is derived from an external source which is a corresponding CGM device 100, such as in an embodiment to be described, a DelayEn bit 204 (see FIG. 16) of the control register should be set in those CGM devices 100 which provide colour, so that the mixing CGM device 100 has sufficient time to calculate the mix value, and pass it to its output where it can be then transmitted to the MIXIN input 107 of each of the colour CGM devices 100. Such an arrangement is described in relation to FIG. 19.

Figure 15:
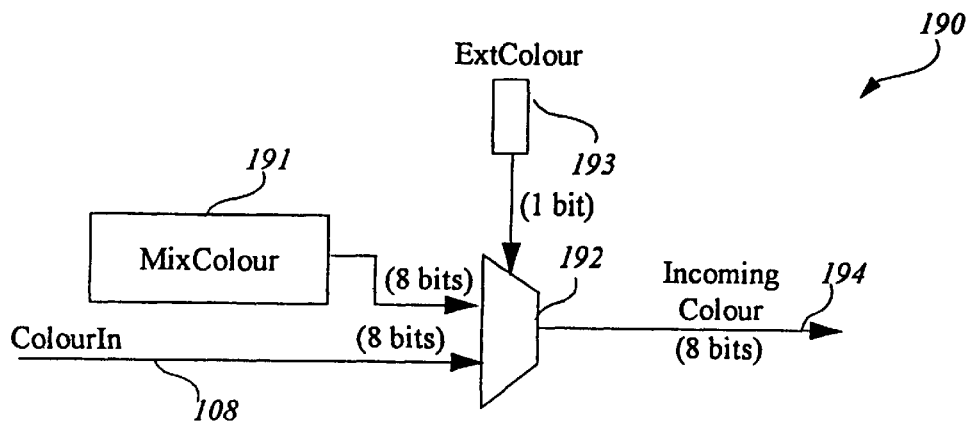
FIG. 15 is a schematic block diagram representation of the select incoming colour unit of FIG. 7.

Returning to FIG. 7, operating in parallel to the select mix unit 180 is a Select ColourIn unit 190, shown in detail in FIG. 15, has a corresponding structure to that of the unit shown in FIG. 14. In this case, the CLORIN signal 108 and a predetermined MixColour 191 are supplied to a multiplexer 192 which selects the incoming colour 194. The selection is afforded by an ExtColour bit 193 of the control register.

Figure 16:
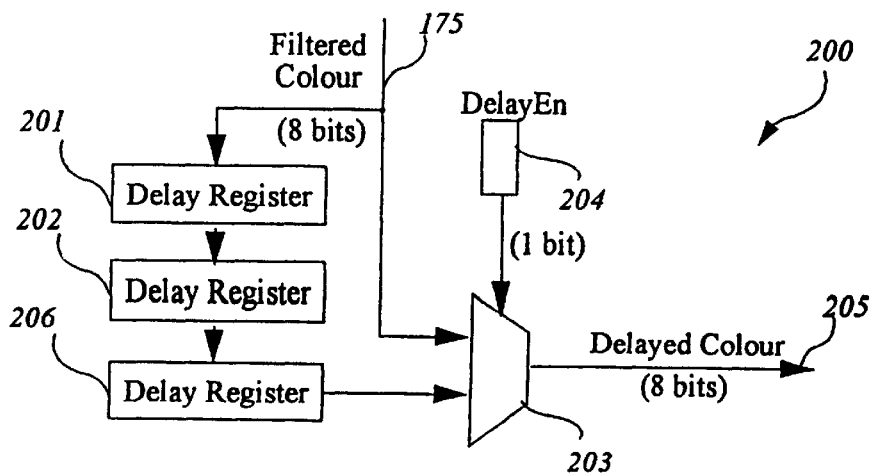
FIG. 16 is a schematic block diagram representation of the delay mix unit of FIG. 7.

Returning to FIG. 7, in some circumstances, it is useful to delay the mixing of the filtered colour 175 with the incoming colour 194 and this provided by a delay mix unit 200 which is seen in FIG. 16.

As seen in FIG. 16, the filtered colour 175 supplies three cascaded delay registers 201, 202 and 206 which output to a multiplexer 203, also input with the filtered colour 175. A delay enable control bit 204 operates upon the multiplexer 203 to select the delayed colour 205.

The delay time must be equal to the time it takes to pass the MIXIN value 107 through the select mix unit 180, the mix interpolator 210 and the select output unit 220. This delay is set to a fixed number of clock cycles. When the DelayEn bit 204 is set, the delay is used. If the bit is clear, then there is no delay between the low pass filter unit 170 and the mix interpolator 210.

Figure 17:
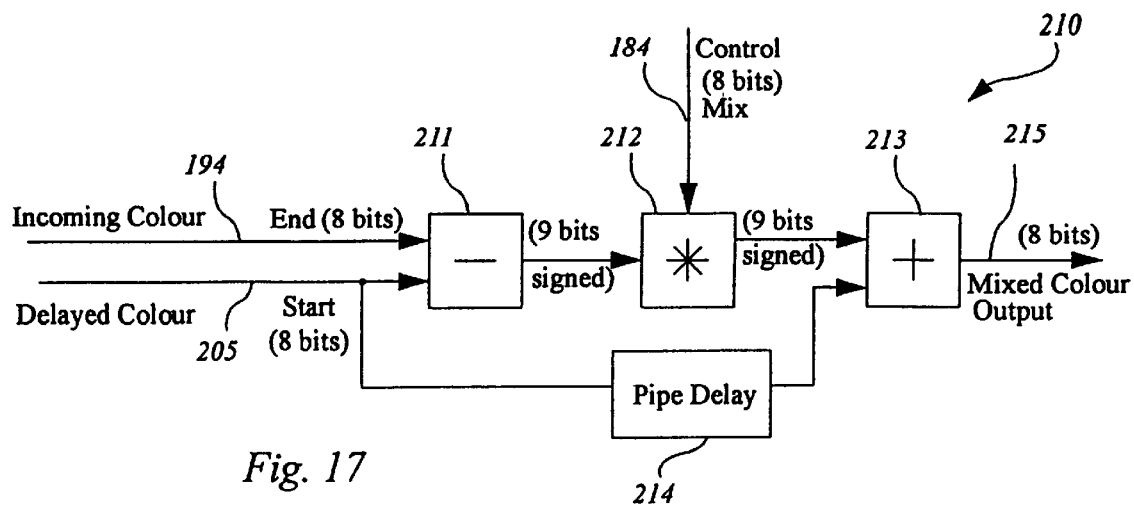
FIG. 17 is a schematic block diagram representation of the mix interpolator unit of FIG. 7.
Figure 18:
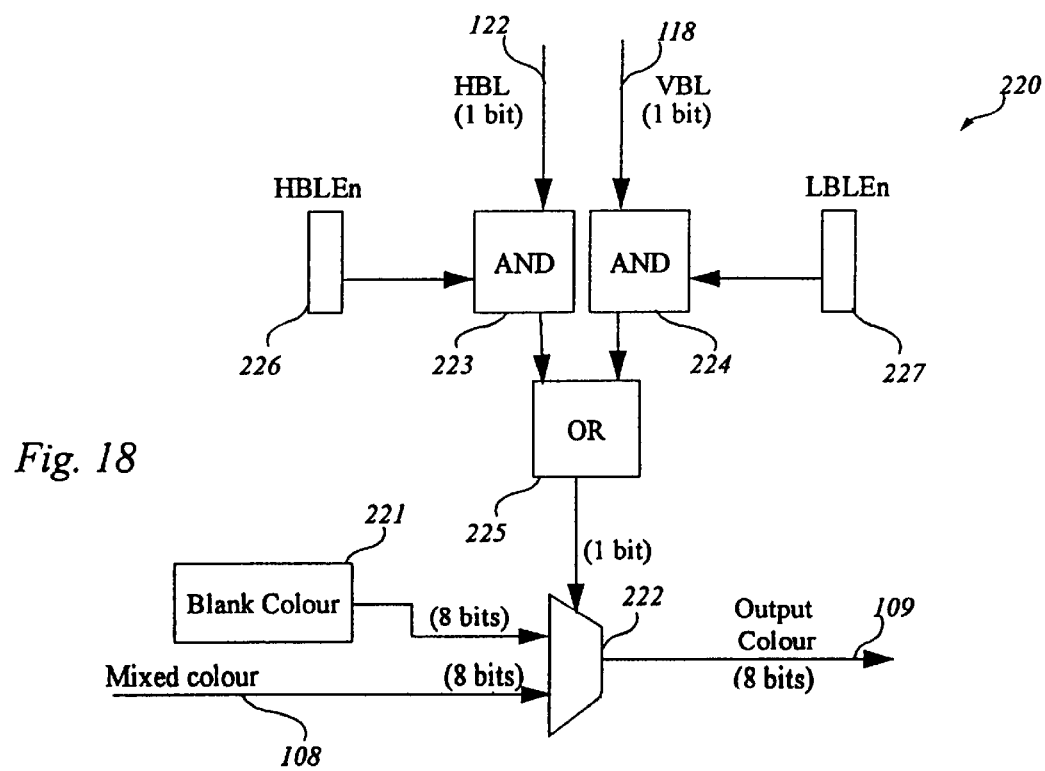
FIG. 18 is a schematic block diagram representation of the select output unit of FIG. 7.

The mix interpolator unit 210 is input with the mix value 184, the delayed colour 205, and the incoming colour 194 and is shown in FIG. 17.

The mix interpolator unit 210 is configured in an identical fashion to the effects interpolator unit 160 of FIG. 12. The incoming colour 194 and delay colour 205 are input to a subtractor 211 which outputs to a multiplier 212, also input with the mix value 184. The value of the delayed colour 205 is delayed using a delay circuit 214 to be input to an adder 213 supplied with the output of the multiplier 212. The adder 213 outputs a mixed colour output 215.

Returning to FIG. 7, the mixed colour output 215 is input to a select output unit 220 which is shown in detail in Fig., 18.

The mixed colour output 215 from the interpolator 201 cannot always by simply used to provide the output colour 109. During line blanks and vertical blanks, the colour signal must be a certain value, and that value will be device dependent. The blanking signals HBL 122 and VBL 118, from the display synchronisation unit 110 are used to switch between the mixed colour output 215 and a fixed blanking colour residing in a BlankColour register 22.

The blanking signals HBL 122 and VBL 118 are respectively input into AND gates 223 and 224, each of which is respectively input with enable bits from single bit control registers HBLEn 226 and LBLEn 227. If either of the blanking signals occur, and the corresponding enable bit is set, then the BlankColour 211 is passed to the output colour 109 via a multiplexer 222 whose input is selected via an OR gate 225 input with the outputs of the AND gates 223 and 224.

Figure 19:
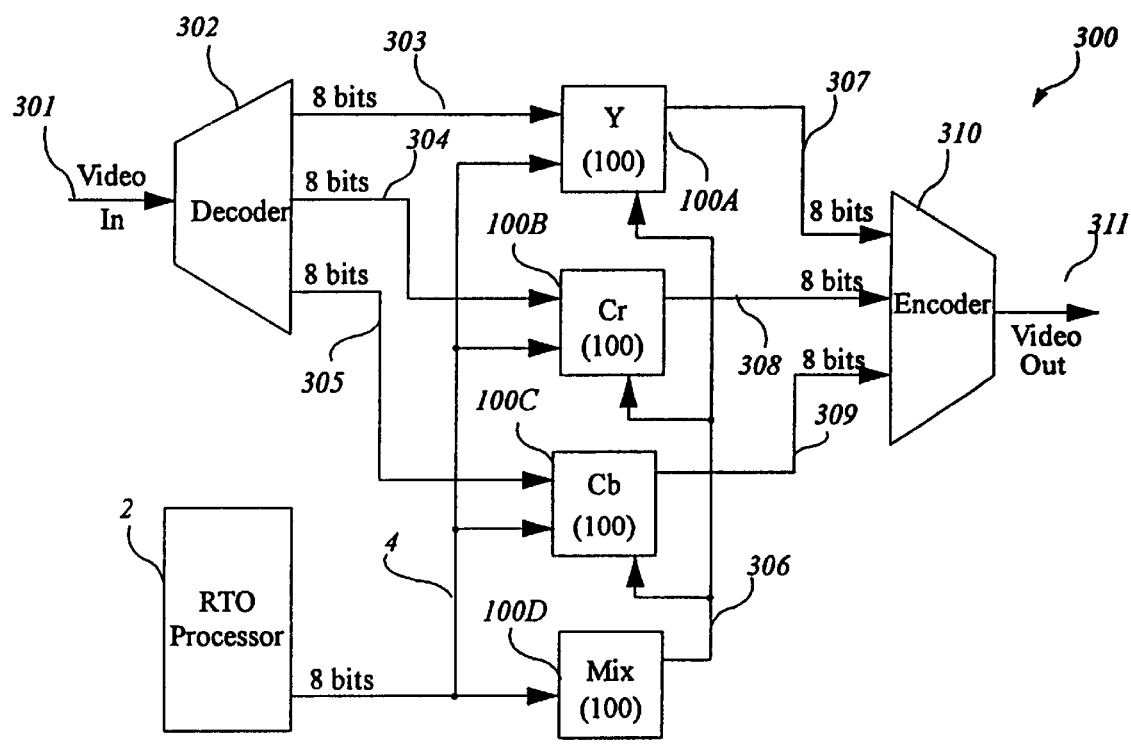
FIG. 19 is a schematic block diagram representation of a composite video mixing system using devices of the preferred embodiment.

Turning now to FIG. 19, a specific arrangement of a live video mixer 300 which incorporates four of the CGM devices 100, in this case designated 100A, 100B, 100C and 100D. The mixer 300 operates to combine a video input signal 301 with object based graphic images output from an RTO processor 2. It will be apparent to those skilled in the art that the RTO processor 2 and the CGM devices 100A–100D are also configured in a similar manner to the graphics system 6 of FIG. 5. The video signal 301 is input to a decoder 302 which divides the composite video signal into its three colour components of luminance Y 303, and chrominance values Cr 304 and Cb 305. Each of these signals is respectively supplied to the colour input 108 of the corresponding CGM devices 100A–100C. The RTO processor 2 outputs level and effects data 4 to each of the four devices 100A–100D which is input to the inputs 105 and 106 in the manner described above. In this particular configuration, the CAM device 100D operates to create a mixing colour from a preselected mixing value, which is output 306 from the output colour terminal 109 of the device 100D and is supplied to the mixing input 107 of each of the other devices 100A–100C. In this manner, each level input 4 to the devices 100A–100C can be mixed in different proportions with the incoming video signals 303–305. This effectively gives each colour definition a mixed component. The outputs 307–309 of the devices 100A–100C each thereafter supply an encoder 310 which reforms the video signal to provide a composite video output 311.

In this arrangement, the output from the each of the devices 100A–100C must be synchronous, indicating that the internal delay of those devices is enabled, whereas the internal delay of the mixing device 100D is not enabled.

Referring now to FIG. 6, FIG. 7 and FIG. 19, a number of examples of operation of the video mixer 300 utilizing the effects input 27 will now be explained. Firstly to achieve a simple colour with no effects, the effects mode 27 and random mask 32 are set to zero, then the original colour 25 and mix 31 mix are not modified in any way by the Effects processing.

A high quality image can be obtained by using just the original colour and mix. For example, high quality images can be obtained by using plain colour objects containing a single colour with no blending of colours, blended objects with colour blends in the X or Y direction, or blended mix objects, such as a mix blend in one direction that fades out towards the bottom of that object.

The simplest applied effect is to tend all the colours on one Effects Mode towards another. The base colour will then have the effects applied to it. Examples of this type of effect include:

Shadows. This can be achieved by setting the EffectsColour 144 on a fall-through Effects Mode to be black.

Any object drawn in that Effects Mode will have its base colour tend towards black. The darkness of the shadow would depend on the value of MinTend 143—the higher MinTend, the darker the shadow.

Embossing. This can be achieved by setting the EffectsColour 144 on a fall-through Effects Mode to be black (for the shadow part of the emboss effect). The other fall-through Effects Mode should be tended towards White (in the same way as the black Effects Mode), to provide the lightening part of the emboss effect. The object can then be drawn three times, once to the right on level N in the shadow Mode, once to the left on level N+1 in the lighten Mode, and once on level N+2 in an opaque Effects Mode where the colours for level N+2 are the same as the background.

Water and fire effects can be achieved by setting a fall-through Effects Mode Effects Colour to blue, red, orange or yellow. They then work in the same way as shadows.

More impressive effects can be achieved using the random feature of the CGM device 100. Each pixel clock generates a random number which is masked, and added to he minimum tend amount. By setting the mask to a particular value, the amount of tendency towards the effects colour will vary. This can create textures, electric colours, and complete noise. The larger the random value, the wider the range of tendency.

Setting the Random Mask 32 on different colour components can produce textures and mottled colours. These can be improved if the objects are drawn over blended objects. For example, setting the random values to be within a certain range of:

green can be used to produce textured grass and trees.

blue can be used to produce textured sky.

yellow/red can be used to produce fire.

white can be used to produce textured mist.

black can be used to produce smoke.

yellow/brown can be used to produce sand or ground

Altering the base amount while leaving the random amount fixed can also produce some useful effects. Note that the effects generator of the CGM device 100 limits the addition of the base amount and the random value to 255 so as to prevent wraparound, enabling safe use near colours that are near saturation. For example:

An animated actor could materialise by having a random mask of 0×3F on mix value. As the base amount increases from 0 to 0×FF, the ghost will randomly flicker into existence, getting lighter all the time. Adding random tendencies towards yellow during the materialisation process would produce an effect similar to that seen in the popular science fiction television series "Star" Trek and known as a beaming process.

Setting the EffectsColour 144 to black, grey or white and a random mask of 0×3F can create an appearance of filling the object with smoke, mist or cloud. As MinTend increases, the image randomly tends more and more towards the Effects Colour 144, until the entire object is the Effects Colour.

As a final example, usage of the mixing input can fade the entire colour input 205 up or down over the background, even while the random effects are active. This can be very useful in producing credits, fading animated routines away and producing video fades.

Where the configuration of FIG. 19 is applied to colour printing using the CANON COLOUR LASER COPIER CLC500, only one colour is required at any one time because such a device uses a four pass method for each of the colours CYMK. Accordingly, only two of the devices 100 are required, one performing the mixing function and the other operating on the colours CMY and K in respective passes. Between each pass, the device 100 can have its colour registers updated with the revised colour (CMY or K) for the appropriate printing effect.

The foregoing describes only a number of embodiments of the present invention, and modifications, obvious to those skilled in the art can be made thereto without departing from the scope of the present invention.

We claim:

1. A colour mixing and generation system, comprising:
   a first input for receiving colour level data of pixels of an image intended for display;
   a pixel location input for receiving a first pixel location and a second pixel location of said image;
   a calculator connected to said first input and to said pixel location input for calculating a blend of colours for each said pixel between said first pixel location and said second pixel location, inclusively;
   a second input for receiving effects data, the effects data being different from said calculated blend of colours;
   a first determinator, connected to said second input and to said pixel location input, for determining from said effects data a type of effect for each of said pixels between said first pixel location and said second pixel location, respectively; and
   a second determinator for determining, for each of said pixels between said first pixel location and said second pixel location, a generated colour from said blend of colours and from said type of effect.

2. A colour mixing and generation system as claimed in claim 1 further comprising a mixer for mixing said generated colours, for each of said pixels between said first pixel location and said second pixel location, with a corresponding mixing input colour signal to thereby provide a mixed output signal of said system.

3. A colour mixing and generation system as claimed in claim 1 wherein said first determinator comprises a current line input and said blend of colours is derived from said first input and said current line input.

4. A colour mixing and generation system as claimed in claim 1 wherein said calculator comprises a current pixel input and said blend of colours is derived from said first input and said current pixel input.

5. A colour mixing and generation system as claimed in claim 1 wherein said calculator comprises a current pixel input, a current line input, and a blend of colours selection input, and in which said blend of colours is derived from said first input and from either said current pixel input or said current line input as determined by said blend of colours selection input.

6. A colour mixing and generation system as claimed in claim 1 wherein said first determinator further provides a tend amount output and said second determinator determines said generated colours from said tend amount output.

7. A colour mixing and generation system as claimed in claim 6 wherein said second determinator determines said generated colours using said tend amount output.

8. A colour mixing and generation system as claimed in claim 6 wherein said second input selects a tend amount value and said tend amount output is derived from said tend amount value and a pseudo-random number.

9. A colour mixing and generation system as claimed in claim 8, wherein said pseudo-random number is generated within said first colour determinator from timing signals associated with a display driven by said system.

10. A colour mixing and generation system as claimed in claim 1 wherein said system is configured to output said generated colours is real-time to a rasterised display thereby-permitting real-time rendering of colour images on said display.

11. A colour mixing and generation system as claimed in claim 10 wherein said display is selected from the group consisting of a video display and a printer.

12. A colour mixing and generation system as claimed in claim 2 further comprising a filter for filtering said generated colours to provide corresponding filtered colours.

13. A colour mixing and generation system as claimed in claim 2 wherein said mixing of input signals permits variations in the mixing of said generated colours and the input colour signal.

14. A computerised graphics system comprising a graphics processor for calculating graphic image data for reproduction on a rasterised display, and a colour mixing and generation system as claimed in claim 2 interconnecting said processor and said display for outputting colour data in rasterised format to said display.

15. A graphics system as claimed in claim 14 wherein said processor is a real-time object based processor that outputs colour level data to said first input in said rasterised format.

16. A graphics system as claimed in claim 15 wherein said mixing input colour signal is derived from a real-time video source and is mixed with said colour level data to provide a composite image for reproduction on said display.

17. A system as claimed in claim 16 comprising a plurality of said colour mixing and generation systems each operable to mix a portion of said video source with said colour level data.

18. A system as claimed in claim 16 comprising three of said colour mixing and generation systems operable respectively on luminance (Y) and chrominance (Cr, Cb) components of said video source, a further said colour mixing and generation system arranged to determine a mixing value for each of said three colour mixing and generation systems, a decoder for decoding said video source into its Y, Cr and Cb components for input into said three systems, and an encoder for receiving the outputs of said three systems to provide a composite video output of said graphics system.

19. A colour mixing and generation system, comprising:

a first input for receiving colour level data of pixels;

a pixel location input for receiving a first pixel location and a second pixel location of said image;

a calculator connected to said first input and to said pixel location input for calculating a blend of colours for each said pixel between the first pixel location and the second pixel location, inclusively;

a second input for receiving effects data from which random data is to be determined, the effects data being different from said calculated blend of colours;

a first determinator, connected to said second input and to said pixel location input, for determining from said effects data a type of randomized effect for each of said pixels between said first pixel and said second pixel location, respectively; and a second determinator for determining, for each of said pixels between said first pixel location and said second pixel location, a generated colour from said blend of colours and from said type of effect.

* * * * *

UNITED STATES PATENT AND TRADEMARK OFFICE
CERTIFICATE OF CORRECTION

PATENT NO. : 5,900,862
DATED : May 4, 1999
INVENTOR(S) : Kia Silverbrook, et al

Page 1 of 3

It is certified that error appears in the above-identified patent and that said Letters Patent is hereby corrected as shown below:

COLUMN 1

```
Line 14, "1993" should read --1993, now patent
 No. 5,444,839--;
Line 27, "crossreference" should read --cross-referenced--;
Line 62, "RTC" should read --RTO--.
```

COLUMN 3

```
Line 7,  "system I" should read --system 1--;
Line 19, "colour," should read --color--; and
Line 20, "colour;" should read --colour.--.
```

COLUMN 5

```
Line 15, "pixel," should read --pixel;--;
Line 50, "100" should read --110--;
Line 56, "MnLine" should read --MinLine--; and
Line 59, "MnLine" should read --MinLine--.
```

COLUMN 6

```
Line 39, "Minlixel" should read --MinPixel--;
Line 47, "MiLiine" should read --MinLine--; and
Line 56, "LSJB's," should read --LSB's,--.
```

UNITED STATES PATENT AND TRADEMARK OFFICE
CERTIFICATE OF CORRECTION

PATENT NO.  : 5,900,862
DATED       : May 4, 1999
INVENTOR(S) : Kia Silverbrook, et al It is certified that error appears in the above-identified patent and that said Letters Patent is hereby corrected as shown below:

COLUMN 9

Line 12, "f6r" should read --for--; and
Line 28, "150," should read --150--.

COLUMN 11

Line 16, "N" should be deleted;
Line 31, "CLORIN" should read --CLRIN--; and
Line 64, "fig.," should read --Fig.--.

COLUMN 12

Line 3, "118," should read --118--;
Line 6, "22." should read --221.--;
Line 33, "CAM" should read --CGM--;

Line 59, "direction or," should read --direction, or--

UNITED STATES PATENT AND TRADEMARK OFFICE
CERTIFICATE OF CORRECTION

PATENT NO. : 5,900,862  
DATED : May 4, 1999  
INVENTOR(S) : Kia Silverbrook, et al It is certified that error appears in the above-identified patent and that said Letters Patent is hereby corrected as shown below:

COLUMN 13

Line 23, "he" should read --the-; and  
Line 54, ""Star" Trek" should read -- "Star Trek"--

Signed and Sealed this

Fourth Day of January, 2000

Attest:

Attesting Officer

*Acting Commissioner of Patents and Trademarks*